United States Patent [19]

Howard et al.

[11] Patent Number: 4,554,447
[45] Date of Patent: Nov. 19, 1985

[54] MULTI-ELEMENT SPECTRAL FILTER WITH CURVED INTERIOR SURFACES

[75] Inventors: James W. Howard, Natick; David M. Reilly, Acton, both of Mass.

[73] Assignee: Honeywell Inc., Minneapolis, Minn.

[21] Appl. No.: 470,691

[22] Filed: Feb. 28, 1983

[51] Int. Cl.⁴ .................................................. H01J 3/14
[52] U.S. Cl. ..................................... 250/216; 350/439; 350/316
[58] Field of Search ........................ 250/203, 216, 353; 244/3.16; 350/438–439, 316, 575, 442, 1.3, 1.4, 1.6

[56] References Cited

U.S. PATENT DOCUMENTS

| | | | |
|---|---|---|---|
| 3,519,325 | 7/1970 | Abel et al. | 250/203 R |
| 3,761,184 | 9/1973 | McLaughlin, Jr. | 250/216 |
| 3,976,875 | 8/1976 | Engstrom et al. | 350/316 |
| 4,106,855 | 8/1978 | Coon | 350/439 |
| 4,184,749 | 1/1980 | Grossman | 250/216 |

Primary Examiner—David C. Nelms
Assistant Examiner—J. Gatto
Attorney, Agent, or Firm—John S. Solakian; Laurence J. Marhoefer

[57] ABSTRACT

A multi-element spectral filter with curved interior surfaces which provides uniform angular response and is particularly well-suited for use in wide field of view optical detection systems.

16 Claims, 1 Drawing Figure

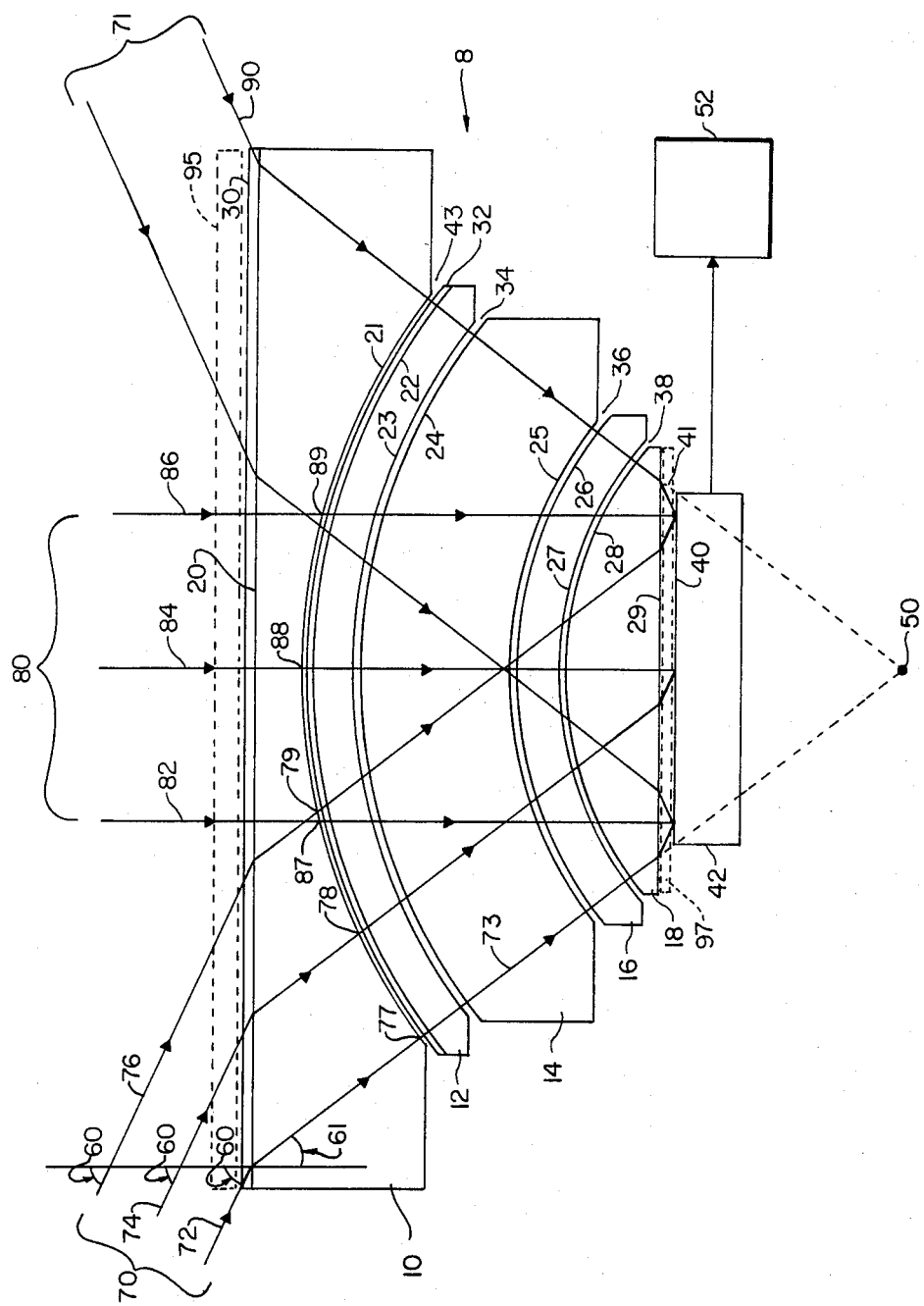

MULTI-ELEMENT SPECTRAL FILTER WITH CURVED INTERIOR SURFACES

BACKGROUND OF THE INVENTION

The present invention relates to the design of optical filters, particularly multi-element spectral filters intended for use in wide field of view (WFOV) optical systems.

The purpose of an optical filter is to transmit radiation within some spectral band ("in-band") while rejecting radiation outside the band ("out-of-band"). To achieve the high degree of spectral discrimination needed by some optical systems, it is often necessary to construct a multi-element spectral filter having both interferring layers and absorbing materials. Typically, these filters have been constructed of planar elements and coatings combined in a sandwich arrangement. This configuration is only suited for cases where the range of incident angles of incident radiation on the filter is small.

In optical systems using spectral filters, it is often desirable that the transmittance of the filter be substantially uniform with respect to the angle of incidence of radiation on the filter (the "field angle.") However, in a WFOV system using a planar multi-element spectral filter, off-axis rays entering the filter traverse longer paths through the absorbing elements than do on-axis rays, so that the filter's transmittance varies as a function of the field angle. In addition, since most interference layer coatings are angularly sensitive, and since the angle of incidence at all surfaces equals the field angle for an all-planar configuration, the off-axis transmittance is further degraded.

In prior WFOV systems (for example, see U.S. Pat. No. 3,278,752) using planar multi-element spectral filters, a negative lens has been placed in front of the filter so that off-axis rays will pass through the filter with reduced angles of incidence. Although this approach provides a uniform angular response, it has the primary disadvantage that the collecting aperture is generally reduced in size, which results in a significant reduction in on-axis sensitivity.

It is, accordingly, a primary object of the present invention to provide an improved multi-element spectral filter for use in WFOV optical detection systems, which filter has substantially uniform angular response, increased sensitivity, has mild surface curvatures, is relatively small in size, and which is easily fabricated.

SUMMARY OF THE INVENTION

These and other objects of the present invention are achieved by providing a multi-element spectral filter assembly comprising substantially concentric curved internal absorbing elements positioned between two transmissive (relatively nonabsorptive) outer elements. These outer elements are shaped such that the entire filter appears substantially like a plane parallel plate.

The thicknesses of absorbing elements are determined by the path length through the material required to produce the optimum spectral response. The thicknesses of the external elements are determined primarily by mechanical considerations such as the diameter of the interior elements and the thickness of material required to provide adequate protection of the entire assembly. The curvature of the interior elements is selected through an optimization process which minimizes variation in angle of incidence on the surface across all field angles.

Interference coatings may be placed on the surfaces of any elements. Interference coatings which have the greatest angular sensitivity may be placed on the outer curved surfaces (which have longer radii of curvature), since angular deviations are minimized at those surfaces. Angularly insensitive antireflection coatings, optimized for an intermediate field angle, are placed on the exterior flat surfaces, as the incidence angles are largest there.

BRIEF DESCRIPTION OF THE DRAWINGS

The above and other objects of the present invention are achieved in the illustrative embodiment as described with respect to the sole FIGURE which illustrates a cross-section through the filter of the subject invention in which on-axis and off-axis optical paths are shown.

DETAILED DESCRIPTION OF THE PREFERRED EMBODIMENT(S)

Referring to the sole FIGURE, the filter 8 of the present invention includes absorptive elements 12, 14 and 16 which are placed between transmissive/protective elements 10 and 18. Surfaces 20 and 29 are substantially parallel. Surfaces 21, 22, 23, 24, 25, 26, 27, and 28 are substantially concentric about center of curvature or point 50, as shown. The spaces between elements may comprise transmissive coupling fluids, for example, intermediate layers 34, 36, 38 or layers in conjunction with air spaces, such as coating 32 on surface 22 of element 12.

The thickness and choice of materials for internal filter elements 12, 14, and 16 is determined by the absorption coefficients of the selected materials as well as the transmittance requirements of filter 8. External elements 10 and 18 generally comprise nonabsorbing materials whose index of refraction matches those of the interior elements 12, 14, and 16. As a result, their thicknesses are primarily controlled by mechanical considerations. For example, it will generally be desired to minimize the thickness of element 10 such that the overall size and weight of the filter is reduced, as long as structural stability and protection of internal elements is provided. Rear element 18 nests into the last absorbing element 16, as shown, and therefore its center thickness must be greater than or equal to:

$$R - \sqrt{R^2 - (D/2)^2}$$

where R is the radius of surface 28 of element 18 and, D is the clear aperture, i.e., the useable diameter, of surface 28 of last absorbing element 16.

The radii of curvature of curved surfaces 21 through 28 of elements 10, 12, 14, 16 and 18 are controlled by several criteria. In general, all surface curvatures are selected such that the distribution of incident ray angles for all field angles is minimized. Minimization of the incident ray angles leads to a configuration where the curved surfaces are substantially concentric with the center of curvature of all surfaces located behind the desired optical detection surface, and where one ray in each beam at any given field angle is normal to the curved surfaces.

It should be noted that in the present embodiment, and, by way of example, elements 10, 12, 14, 16, and 18 have substantially the same index of refraction. Thus, the curvature of surfaces 21 and 22 may be selected such that extreme ray 72 of light beam 70 entering the filter 8 at maximum field angle 60, is refracted by element 10 to angle 61. Ray 72 as so refracted is substantially normal to surface 21 at point 77, while rays 74 and 76 contact surface 21 at points 78 and 79, respectively, at a slightly different angle of incidence. Similarly, the central ray 84 of on-axis light beam 80 would be normal to surface 21 at point 88, while rays 82 and 86 would strike surface 21 at points 87 and 89, respectively, at a slightly different angle.

Absorbing elements 12, 14 and 16 have concentric surfaces such that once light beams 70, 71 and 80 have been refracted by element 10 such that the optical rays are as close to normal as possible to surface 21, the optical path lengths through each element will be substantially the same for all field angles. Thickness and relative arrangement of the absorbing materials is determined by the length of the optical path through each material required to produce a given desired transmittance, as well as other mechanical considerations.

In one embodiment the filter of the present invention might be designed such that the center of curvature 50 of curved surfaces 21 through 28 lies at or near the intersection of the extension of ray 84 (which might comprise the optical axis of the system) and the refracted portion 73 of intermediate ray 72 of light beam 70, as well as the refracted portion of ray 90. Optical detection surface 40 of optical detection device 42 is generally placed between surface 29 of element 18 and the center of curvature 50 such that the optical detection device 42 will measure all energy collected by the apparatus for the desired field of view, between rays 72 and 90, as shown. Generally there will be an airspace 41 between surfaces 29 and 40 to promote mechanical isolation of the detection device 42 from the heavier filter apparatus 8.

It should be noted that in the embodiment given, by way of example, elements 10, 12, 14, 16, and 18 have substantially the same index of refraction, and thus the interior surfaces 21 through 28 are substantially concentric about the single point 50. If materials of differing indices of refraction were chosen, substantially the same filter effect might be obtained by allowing the curvatures of the interior surfaces to vary, as long as the variations in angle of incidence of all rays for any given field angle are minimized such that the performance of the filter is substantially uniform with respect to field angle.

Thus, a system comprising the present invention might filter and collect light energy through a field angle 60 defined by extreme rays 72 and 90. Each ray, for example ray 72, would be refracted as it enters element 10. Then, since the indices of refraction of materials in elements 10 through 18 are substantially the same, the rays would proceed along a substantially straight path through filter 8. The average optical path length of all ray bundles through each filter element are substantially equal, since the filter element surfaces are curved such that they are substantially normal to substantially all of the incident rays for any given field angle. Optical detection device 42 measures the amount of collected energy for analysis by signal processing equipment 52.

In one embodiment of the present invention, outer elements 10 and 18 may comprise quartz, interior elements 12 and 16 may comprise filter glass such as Schott UG 5 (or Hoya U330), and element 14 may comprise nickel sulfate hexahydrate. External film 30 may comprise a spectrally broad antireflection coating optimized at a thirty degree angle of incidence. A coating on surface 21 may comprise a metal-dielectric coating. Film 32 may comprise one or more organic solids dispersed in a film such as polyvinyl alcohol. Layers 34, 36 and 38 may comprise liquid layers of, for example, DC 200. Detection device 42 may comprise a photomultiplier tube.

The apparatus of the present invention may further comprise either or both of elements 95 and 97 which are shown by way of dotted lines in the sole FIGURE. Such elements 95 and 97 are substantially planar optical elements which comprise materials which have substantially low out-of-band absorption or in the alternative have relatively low in-band absorption and relatively high out-of band absorption. The purpose of these elements is to provide an improved spectral filtration where construction of a curved element of a particular material would be costly or inefficient. One such material may be nickel sulfate hexahydrate.

Having described the invention, what is claimed as new and novel and for which it is desired to secure Letters Patent is:

1. Apparatus for optical spectral filtration of incident radiation from a desired field of view, which provides substantially uniform angular response over a desired spectral waveband ("in-band"), said apparatus comprising:

A. a first optical element having substantially low in-band absorption and having a substantially plano-concave shape which includes a first planar surface and a first concave surface and wherein said first concave surface has a given center of curvature, wherein such substantially low in-band absorption is substantially the same as that available by use of the material nickel sulfate hexahydrate;

B. one or more interior optical elements positioned between said first optical element and said given center of curvature, said interior element(s) having substantially concavo-convex shape(s) which includes a convex surface and a concave surface, and wherein the outer convex surface(s) and inner concave surface(s) of said interior element(s) are substantially concentric about said given center of curvature; and C. a second optical element having substantially low in-band absorption and having a substantially plano-convex shape, which includes a second planar surface and a second convex surface, said second optical element positioned between said interior optical element(s) and said given center of curvature, wherein said second convex surface of said second element is substantially concentric about said given center of curvature and wherein said second planar surface is substantially parallel to said first planar surface of said first element.

2. Apparatus as in claim 1 in which said interior element(s) comprise materials having relatively low in-band absorption and relatively high out-of-band absorption, and wherein said relatively low in-band absorption and said relatively high out-of-band absorption are substantially the same as that available by use of the material nickel sulfate hexahydrate.

3. Apparatus as in claim 1 in which there are at least two (2) of said interior optical elements and wherein some of said interior optical elements comprise materials having relatively low in-band absorption and relatively high out-of-band absorption and wherein the remaining ones of said interior optical elements comprise materials having only a relatively low in-band absorption.

4. Apparatus as in claim 1 in which the indices of refraction and radii of curvature of said surfaces of said first optical element, said one or more interior optical elements and said second optical element are selected such that:
   A. for any light ray incident on said first planar surface of said first optical element from within said desired field of view, the optical paths through each of said interior optical elements are substantially the same length; and wherein
   B. most light rays incident on said first planar surface of said first optical element from within said desired field of view are substantially normal to each of said concave and convex surfaces of said first, second and interior optical elements.

5. Apparatus as in claim 4 in which said indices of refraction of said first, second and interior optical elements are substantially the same.

6. Apparatus as in claim 1 wherein optical layers are placed between said surfaces of said first, second and interior optical elements to provide improved spectral filtration and to prevent mechanical and environmental damage.

7. Apparatus as in claim 1 wherein said first, second and interior optical elements are coupled such that air spaced between said elements are minimized.

8. Apparatus as in claim 1 wherein:
   A. said first and second optical elements comprise quartz; and
   B. said interior optical elements comprise three or more materials selected from the group of the following materials: Schott UG 5, Schott UG11, Hoya U330, Hoya U340, and nickel sulfate hexahydrate.

9. Apparatus as in claim 8 wherein optical layers are placed between said surfaces of said first, second and interior optical elements to provide improved spectral filtration and to prevent mechanical and environmental damage.

10. Apparatus as in claim 9 wherein said intermediate layers comprise organic solids dispersed in an alcohol based medium and optical coupling fluids.

11. Apparatus as in claim 10 wherein said alcohol based medium is a polyvinyl alcohol film.

12. Apparatus as in claim 10 wherein said optical coupling fluid layers are positioned between said interior elements and between said interior elements and said second optical element, and wherein said organic solids are positioned between said first optical element and said interior elements.

13. Apparatus as in claim 1 further comprising optical detection means positioned such that said detection means measures radiation transmitted through said first, second and interior optical elements over said desired field of view.

14. Apparatus as in claim 13 wherein said optical detection means comprises a photomultiplier tube.

15. Apparatus as in claim 13 further comprising signal processing means electrically coupled to said optical detection means.

16. Apparatus as in claim 13 wherein substantially planar optical element(s) comprising materials having relatively low in-band absorption and relatively high out-of-band absorption are coupled between said second optical element and said detection means and between said first optical element and said desired field of view for the purpose of providing improved spectral filtration where construction of a curved element of a particular material would be costly or inefficient, wherein said relatively low in-band absorption and said relatively high out-of-band absorption are substantially the same as that available by use of the material nickel sulfate hexahydrate.

* * * * *